(12) United States Patent
Shimoeda

(10) Patent No.: US 11,899,182 B2
(45) Date of Patent: *Feb. 13, 2024

(54) IMAGING LENS SYSTEM AND IMAGING DEVICE COMPRISING SEVEN LENSES OF −−++−+−REFRACTIVE POWERS

(71) Applicant: Maxell, Ltd., Kyoto (JP)

(72) Inventor: Yukihiro Shimoeda, Kyoto (JP)

(73) Assignee: MAXELL, LTD., Kyoto (JP)

( * ) Notice: Subject to any disclaimer, the term of this patent is extended or adjusted under 35 U.S.C. 154(b) by 56 days.

This patent is subject to a terminal disclaimer.

(21) Appl. No.: 17/546,950

(22) Filed: Dec. 9, 2021

(65) Prior Publication Data

US 2022/0099946 A1  Mar. 31, 2022

Related U.S. Application Data

(63) Continuation of application No. 16/616,678, filed as application No. PCT/JP2018/024681 on Jun. 28, 2018, now Pat. No. 11,231,561.

(30) Foreign Application Priority Data

Sep. 13, 2017  (JP) .................................. 2017-175546

(51) Int. Cl.
G02B 13/00 (2006.01)
G02B 9/64 (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 5,552,937 A | 9/1996 | Ono et al. |
| 2009/0052057 A1 | 2/2009 | Lin |

(Continued)

FOREIGN PATENT DOCUMENTS

| CN | 101373261 A | 2/2009 |
| CN | 104880808 A | 9/2015 |

(Continued)

OTHER PUBLICATIONS

Nov. 9, 2018 International Search Report issued in International Patent Application No. PCT/JP2018/024681.

(Continued)

*Primary Examiner* — Wen Huang
(74) *Attorney, Agent, or Firm* — Oliff PLC

(57) ABSTRACT

To provide a vehicle-mounted wide-angle lens that simultaneously achieves a high resolution necessary for sensing, a size small enough to be mounted on a vehicle, and a low price. An imaging lens includes, sequentially from the object side, a first lens having a negative power and being concave on the image side, a second lens having a negative power and being concave on the image side, a third lens having a positive power and being convex on the object side, an aperture stop, a fourth lens having a positive power and being convex on the image side, a fifth lens, a sixth lens whose object side is bonded to the image side of the fifth lens and a seventh lens having a negative power and being convex on the image side, and the fourth lens is an aspheric glass lens.

6 Claims, 21 Drawing Sheets

(56) References Cited

U.S. PATENT DOCUMENTS

| | | |
|---|---|---|
| 2010/0284095 A1 | 11/2010 | Lin |
| 2010/0295985 A1 | 11/2010 | Matsusaka |
| 2014/0139931 A1 | 5/2014 | Kubota |
| 2014/0347523 A1 | 11/2014 | Kuwashiro |
| 2016/0334609 A1* | 11/2016 | Lee .................... G02B 15/1425 |
| 2016/0363740 A1 | 12/2016 | Gong |
| 2020/0301105 A1* | 9/2020 | Jung ...................... G02B 21/36 |

FOREIGN PATENT DOCUMENTS

| | | |
|---|---|---|
| JP | H6-300969 A | 10/1994 |
| JP | H8-320435 A | 12/1996 |
| JP | 2001-133685 A | 5/2001 |
| JP | 2011-002817 A | 1/2011 |
| JP | 2014-102291 A | 6/2014 |
| JP | 2014-228733 A | 12/2014 |
| JP | 2016-170446 A | 9/2016 |

OTHER PUBLICATIONS

Apr. 6, 2021 Office Action issued in Chinese Patent Application No. 201880031487.6.

Jun. 21, 2022 Office Action issued in Japanese Patent Application No. 2021-128708.

\* cited by examiner

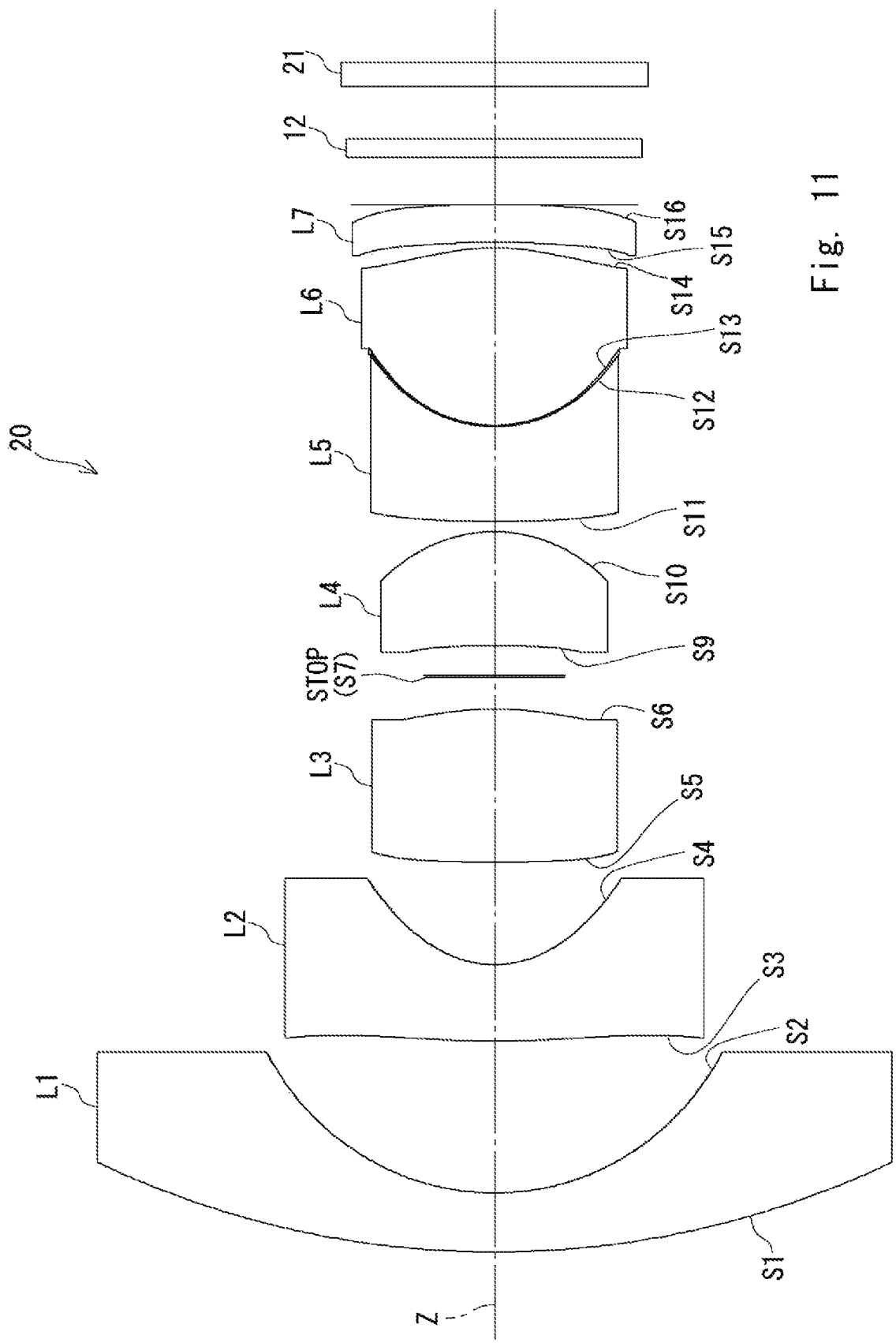

IMAGING LENS SYSTEM AND IMAGING DEVICE COMPRISING SEVEN LENSES OF −−++−+−REFRACTIVE POWERS

This application is a continuation application of U.S. patent application Ser. No. 16/616,678 filed Nov. 25, 2019, which is a national stage entry of PCT/JP2018/024681 filed Jun. 28, 2018, which claims priority to Japanese application JP 2017-175546 filed Sep. 13, 2017. The disclosures of each reference are hereby incorporated by reference in their entireties.

TECHNICAL FIELD

The present invention relates to an imaging lens system and an imaging device.

BACKGROUND ART

The use of a vehicle-mounted wide-angle lens is changing from viewing to sensing today. Sensing requires the resolution necessary for image analysis, and therefore high-resolution images in megapixels are needed. Further, performance variation with temperature is seen as important for a vehicle-mounted wide-angle lens. For example, Patent Literature 1 discloses a wide-angle lens for vehicle use.

On the other hand, there is a need for a small and inexpensive vehicle-mounted wide-angle lens. Thus, the market demands a high-performance, small-size and low-price vehicle-mounted wide-angle lens.

CITATION LIST

Patent Literature

PTL1: Japanese Unexamined Patent Application Publication No. 2014-102291

SUMMARY OF INVENTION

Technical Problem

However, to achieve a vehicle-mounted wide-angle lens with high resolution and enhanced performance based on temperature, glass lenses are heavily used, which results in a large-size, expensive camera. Therefore, it has not been able to produce a vehicle-mounted wide-angle lens that simultaneously achieves a high resolution necessary for sensing, a size small enough to be mounted on a vehicle, and a low price.

Solution to Problem

An imaging lens system according to one embodiment includes, sequentially from an object side, a first lens having a negative power and being concave on an image side, a second lens having a negative power and being concave on the image side, a third lens having a positive power and being convex on an object side, an aperture stop, a fourth lens having a positive power and being convex on the image side, a fifth lens, a sixth lens whose object side is bonded to the image side of the fifth lens, and a seventh lens having a negative power and being convex on the image side, wherein the fourth lens is an aspheric glass lens.

Preferably, in the imaging lens system according to one embodiment, the fourth lens may have the highest power out of lenses having a positive power among the first lens to the seventh lens.

Preferably, in the imaging lens system according to one embodiment, a following expression (2) may be satisfied, where a focal length of the fourth lens is f4 and a focal length of an entire lens optical system is f, $$2.8 < f4/f < 3.5 \qquad (2).$$

Preferably, in the imaging lens system according to one embodiment, a following expression (1) may be satisfied, where a focal length of the fifth lens is f5 and a focal length of an entire lens optical system is f, $$-3.0 < f5/f < -2.2 \qquad (1).$$

Preferably, in the imaging lens system according to one embodiment, the image side of the fifth lens and the object side of the sixth lens may have an aspheric shape.

Preferably, in the imaging lens system according to one embodiment, the second lens, the third lens, the fifth lens, the sixth lens and the seventh lens may be plastic lenses.

An imaging device according to one embodiment includes the imaging lens system according to any one of the above, a lens barrel that holds the imaging lens system, a flat-plate cover glass placed on an object side of the imaging lens system, and an image sensor placed at an image location of the imaging lens system.

Advantageous Effects of Invention

A vehicle-mounted wide-angle lens and an imaging device according to the present invention simultaneously achieve a high resolution necessary for sensing, a size small enough to be mounted on a vehicle, and a low price.

BRIEF DESCRIPTION OF DRAWINGS

FIG. 11 is a sectional view of an imaging device according to an example 6.

DESCRIPTION OF EMBODIMENTS

An imaging lens system and an imaging device according to examples are described hereinafter.

Example 1: Imaging Lens System

Figure 1:
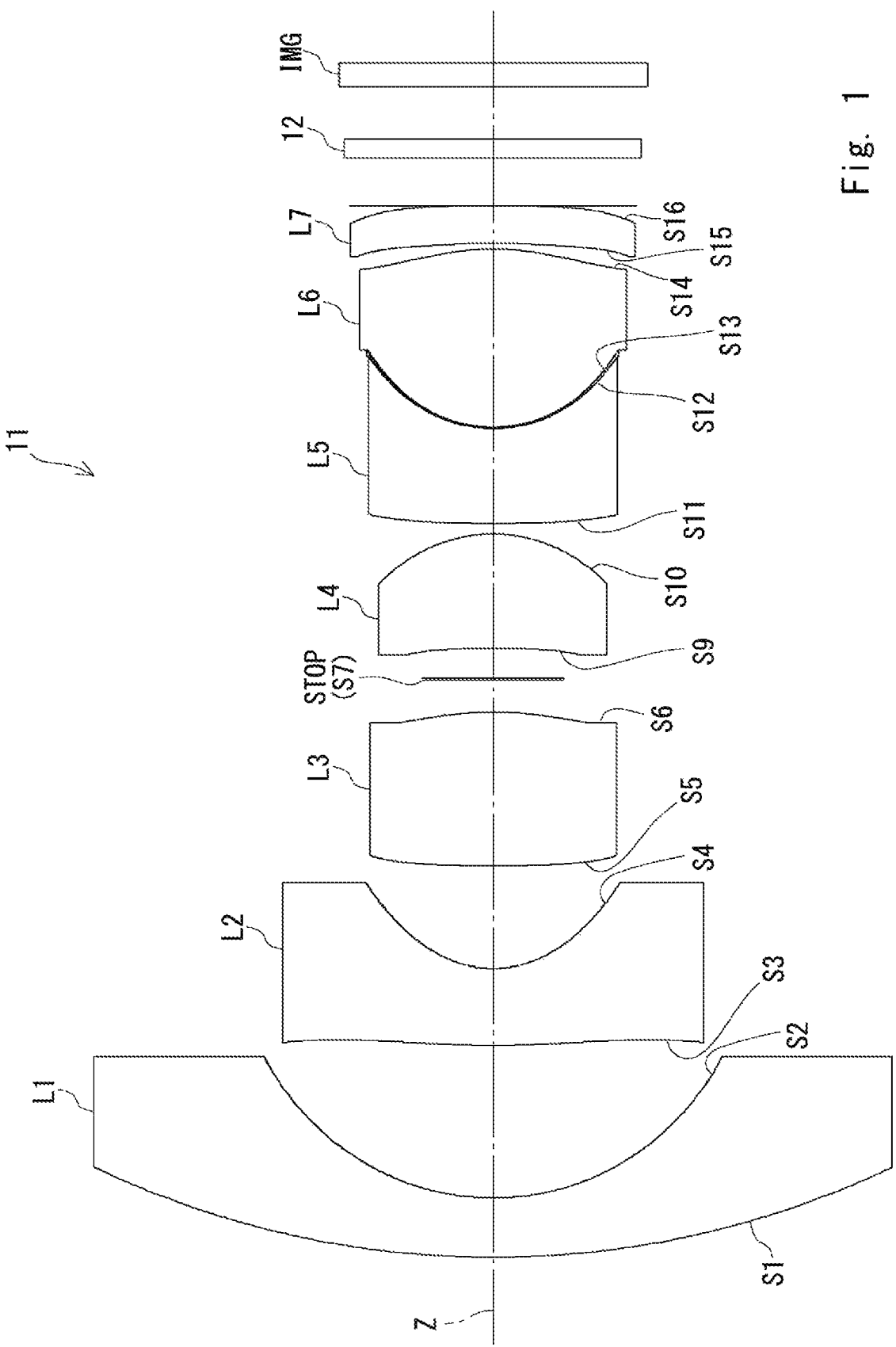
FIG. 1 is a sectional view of an imaging lens system according to an example 1.

FIG. 1 is a sectional view of an imaging lens system according to an example 1. In FIG. 1, an imaging lens system 11 includes, sequentially from the object side, a first lens L1 having a negative power and being concave on the image side, a second lens L2 having a negative power and being concave on the image side, a third lens L3 having a positive power and being convex on the object side, an aperture stop STOP, a fourth lens L4 having a positive power and being convex on the image side, a fifth lens L5, a sixth lens L6 whose object side is bonded to the image side of the fifth lens, and a seventh lens L7 having a negative power and being convex on the image side. Further, the imaging lens system 11 includes an IR cut filter 12. IMG indicates an imaging plane.

The first lens L1 is a lens having a negative power. An object-side lens surface S1 of the first lens L1 has a curved part that is convex to the object side. An image-side lens surface S2 of the first lens L1 has a curved part that is concave to the object side. The first lens L1 is preferably made of ground glass.

The second lens L2 is an aspheric lens having a negative power. An object-side lens surface S3 of the second lens L2 has a curved part that is convex to the object side, and an image-side lens surface S4 of the second lens L2 has a curved part that is concave to the object side. The second lens L2 is preferably a plastic lens.

The third lens L3 is an aspheric lens having a positive power. An object-side lens surface S5 of the third lens L3 has a curved part that is convex to the object side, and an image-side lens surface S6 of the third lens L3 has a curved part that is convex to the image side. The third lens L3 is preferably a plastic lens.

The aperture stop STOP adjusts the amount of light to pass through. For example, the aperture stop STOP is preferably in the form of a plate with a hole.

The fourth lens L4 is an aspheric lens having a positive power. An object-side lens surface S9 of the fourth lens L4 has a curved part that is concave to the image side, and an image-side lens surface S10 of the fourth lens L4 has a curved part that is convex to the image side. The fourth lens L4 is preferably an aspheric glass lens.

The fifth lens L5 is an aspheric lens having a negative power. An object-side lens surface S11 of the fifth lens L5 has a curved part that is convex to the object side, and an image-side lens surface S12 of the fifth lens L5 has a curved part that is concave to the object side. The fifth lens L5 is preferably a plastic lens.

The sixth lens L6 is an aspheric lens having a positive power. An object-side lens surface S13 of the sixth lens L6 has a curved part that is convex to the object side, and an image-side lens surface S14 of the sixth lens L6 has a curved part that is convex to the image side. The sixth lens L6 is preferably a plastic lens.

The image-side lens surface of the fifth lens L5 and the object-side lens surface of the sixth lens L6 are bonded by an ultraviolet curing adhesive, and the fifth lens L5 and the sixth lens L6 form a compound lens. The spacing between the image-side lens surface of the fifth lens L5 and the object-side lens surface of the sixth lens L6 gradually becomes wider as it goes from the optical axis to the outer periphery so as to release air bubbles in the adhesive to the outside. The combined power of the fifth lens L5 and the sixth lens L6 is a positive power.

The seventh lens L7 is an aspheric lens having a negative power. An object-side lens surface S15 of the seventh lens L7 has a curved part that is concave to the image side, and an image-side lens surface S16 of the seventh lens L7 has a curved part that is convex to the image side. The seventh lens L7 is preferably a plastic lens.

The IR cut filter 12 is a filter that cuts out infrared light.

The property data of the imaging lens system 11 is described hereinafter.

First, Table 1 shows lens data of each lens surface in the imaging lens system 11. In Table 1, the curvature radius, the surface-to-surface distance, the refractive index, and the Abbe number are shown as lens data. The surface denoted by the symbol "*" indicates an aspheric surface.

TABLE 1

| Lens Parameter | | | | |
|---|---|---|---|---|
| | Curvature radius | Surface-to-surface distance | nd (Refractive index) | vd (Abbe number) |
| 1st surface | 15.991 | 1.000 | 1.804 | 46.5 |
| 2nd surface | 4.378 | 2.564 | | |
| 3rd surface | 15.662 | 1.283 | 1.545 | 56.2 * |
| 4th surface | 1.861 | 1.717 | | * |
| 5th surface | 42.187 | 2.565 | 1.661 | 20.4 * |
| 6th surface | −5.885 | 0.545 | | * |
| (STOP) 7th surface | INFINITY | 0.030 | | |
| 8th surface | INFINITY | 0.497 | | |
| 9th surface | −23.411 | 1.919 | 1.553 | 71.7 * |
| 10th surface | −2.531 | 0.172 | | * |
| 11th surface | 26.652 | 1.594 | 1.661 | 20.4 * |
| 12th surface | 2.440 | 0.020 | 1.502 | 51.0 * |
| 13th surface | 2.440 | 2.977 | 1.545 | 56.2 * |
| 14th surface | −3.973 | 0.100 | | * |
| 15th surface | −11.079 | 0.630 | 1.545 | 56.2 * |
| 16th surface | −81.773 | 0.100 | | * |
| 17th surface | INFINITY | 0.700 | 1.517 | 64.2 |
| 18th surface | INFINITY | 1.588 | | |

The aspheric shape used for a lens surface is represented by the following expression when z is a sag, c is the inverse of a curvature radius, k is a constant of the cone, r is a height from the optical axis Z, and the 4th-order, 6th-order, 8th-order, 10th-order, 12th-order, 14th-order and 16th-order aspheric coefficients are α4, α6, α8, α10, α12, α14 and α16, respectively.

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

Table 2 shows aspheric coefficients for defining the aspheric shape of an aspheric lens surface in the imaging lens system 11 of the example 1. In Table 2, "−6.522528E−03" means "−6.522528×10⁻³", for example.

TABLE 2

| | \multicolumn{6}{c}{Aspheric coefficients} | | | | | |
|---|---|---|---|---|---|---|
| | 3rd surface | 4th surface | 5th surface | 6th surface | 9th surface | 10th surface |
| k | 0.000000E+00 | −0.584698029 | 0 | 0.000000E+00 | 0.000000E+00 | −0.014941829 |
| α4 | −3.212063E−03 | 1.537786E−03 | 5.007120E−03 | 8.551597E−03 | −8.173230E−03 | 5.043637E−03 |
| α6 | 9.514080E−05 | −1.067514E−03 | −2.332544E−04 | −2.371804E−03 | −1.237787E−03 | −3.462408E−04 |
| α8 | −1.138907E−06 | 3.593001E−06 | 1.323046E−04 | 1.184827E−03 | −1.891273E−04 | 5.526840E−05 |
| α10 | −1.865120E−08 | 0.000000E+00 | 0.000000E+00 | −1.454256E−04 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α16 | 0.000000E+00 | 0.000000E+00 | 0.000000E+00 | 0.000000E+00 | 0.000000E+00 | 0.000000E+00 |
| | 11th surface | 12th surface | 13th surface | 14th surface | 15th surface | 16th surface |
| k | 0 | −2.095437E−01 | −2.095437E−01 | 0 | 0.000000E+00 | 0 |
| α4 | 2.779169E−03 | 6.975202E−03 | 9.975202E−03 | 2.363654E−02 | 1.150292E−02 | −1.331737E−02 |
| α6 | 1.548943E−04 | 1.125342E−04 | 1.125342E−04 | −4.434208E−03 | −2.329412E−03 | 3.993663E−03 |
| α8 | 0.000000E+00 | −1.626998E−04 | −1.626998E−04 | 6.404750E−04 | 5.690953E−05 | −9.674284E−04 |
| α10 | 0.000000E+00 | 0.000000E+00 | 0.000000E+00 | −2.956144E−05 | 0.000000E+00 | 9.632779E−05 |
| α12 | 0.000000E+00 | 0.000000E+00 | 0.000000E+00 | 0.000000E+00 | 0.000000E+00 | −3.320306E−06 |
| α12 | 0.000000E+00 | 0.000000E+00 | 0.000000E+00 | 0.000000E+00 | 0.000000E+00 | 6.930747E−09 |
| α16 | 0.000000E+00 | 0.000000E+00 | 0.000000E+00 | 0.000000E+00 | 0.000000E+00 | 0.000000E+00 |

Figure 2A:
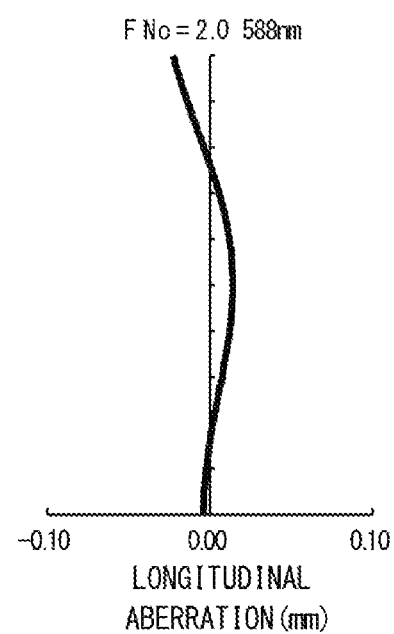
FIG. 2A is a longitudinal aberration diagram of the imaging lens system according to the example 1.
Figure 2B:
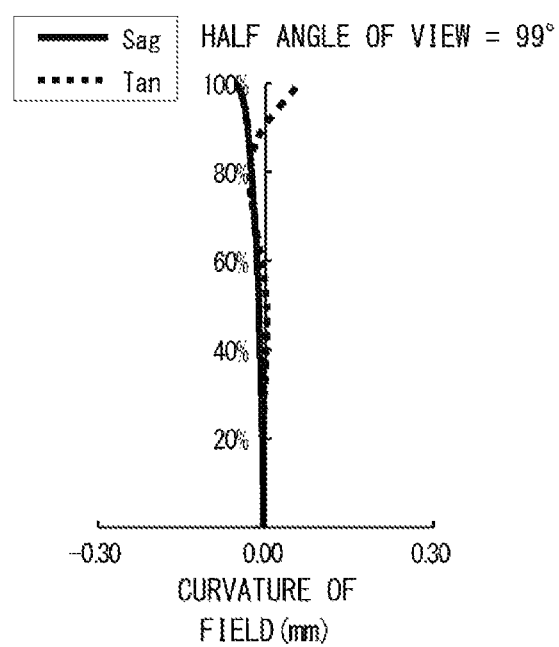
FIG. 2B is a field curvature diagram of the imaging lens system according to the example 1.
Figure 2C:
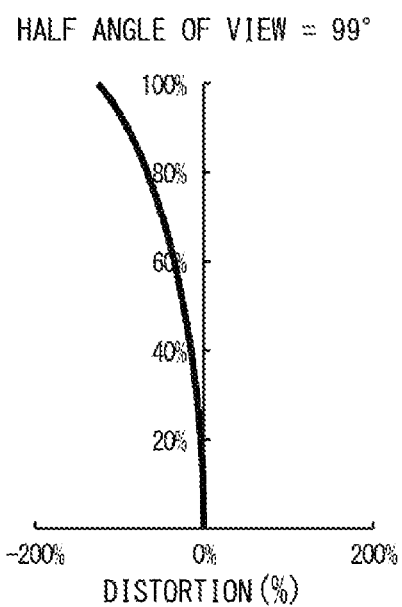
FIG. 2C is a distortion diagram of the imaging lens system according to the example 1.

FIG. 2A is a longitudinal aberration diagram of the imaging lens system in the example 1. FIG. 2B is a field curvature diagram of the imaging lens system in the example 1. FIG. 2C is a distortion diagram of the imaging lens system in the example 1. As shown in FIGS. 2A to 2C, the half angle of view is 99°, and the F-number is 2.0 in the imaging lens system 11 of the example 1. In the longitudinal aberration diagram of FIG. 2A, the horizontal axis indicates a position where a light ray intersects the optical axis Z, and the vertical axis indicates a height of pupil diameter.

In the field curvature diagram of FIG. 2B, the horizontal axis indicates a distance along the optical axis Z, and the vertical axis indicates the image height (angle of view). Further, in the field curvature diagram of FIG. 2B, Sag indicates the curvature of field on a sagittal plane, and Tan indicates the curvature of field on a tangential plane. As shown in the field curvature diagram of FIG. 2B, the curvature of field is corrected appropriately in the imaging lens system 11 of this example. The imaging lens system 11 thereby achieves a high resolution.

In the distortion diagram of FIG. 2C, the horizontal axis indicates the amount of distortion (%) of an image, and the vertical axis indicates the image height (angle of view). The field curvature diagram of FIG. 2B and the distortion diagram of FIG. 2C show results of simulation using a light ray with a wavelength of 588 nm.

Table 3 shows results of calculating property values of the imaging lens system 11 of the example 1. Table 3 shows the property values (a combined focal length $f_{12}$ of the first lens L1 and the second lens L2, a combined focal length $f_{23}$ of the second lens L2 and the third lens L3, a combined focal length $f_{34}$ of the third lens L3 and the fourth lens L4, a combined focal length $f_{45}$ of the fourth lens L4 and the fifth lens L5, a combined focal length $f_{56}$ of the fifth lens L5 and the sixth lens L6, and a combined focal length $f_{67}$ of the sixth lens L6 and the seventh lens L7), $f_4/f$, and $f_5/f$ when the focal length of the whole lens system is f, the focal length of the first lens L1 is $f_1$, the focal length of the second lens L2 is $f_2$, the focal length of the third lens L3 is $f_3$, the focal length of the fourth lens L4 is $f_4$, the focal length of the fifth lens L5 is $f_5$, the focal length of the sixth lens L6 is $f_6$, and the focal length of the seventh lens L7 is $f_7$ in the imaging lens system 11. Each focal length is calculated using a light ray with a wavelength of 588 nm.

TABLE 3

| Example 1 Property | | |
|---|---|---|
| Item | Value | Unit |
| F No | 2.0 | — |
| Optical length | 20.000 | mm |
| Whole system f | 1.574 | mm |
| $f_1$ | −7.796 | mm |
| $f_2$ | −4.005 | mm |
| $f_3$ | 7.986 | mm |
| $f_4$ | 4.966 | mm |
| $f_5$ | −4.173 | mm |
| $f_6$ | 6.657 | mm |
| $f_7$ | −23.583 | mm |
| $f_{12}$ | −2.065 | mm |
| $f_{23}$ | −32.150 | mm |
| $f_{34}$ | 3.834 | mm |
| $f_{45}$ | 5.702 | mm |
| $f_{56}$ | 8.460 | mm |
| $f_{67}$ | 9.133 | mm |
| $f_4/f$ | 3.156 | |
| $f_5/f$ | −2.65 | |

As described above, in the imaging lens system of the example 1, because the fourth lens that is immediately next to the aperture stop is a glass lens, it is possible to widely set the refractive index and the Abbe number and thereby facilitate the correction of aberrations, and therefore the lenses other than this lens can be plastic lenses, which makes it possible to simultaneously achieve a high resolution necessary for sensing, a size small enough to be mounted on a vehicle, and a low price. Particularly, in the case of producing a high-resolution and small-size wide-angle imaging lens system with a lens structure having 7 or more lenses, the price of the imaging lens system increases due to an increased number of aspheric glass lenses. The imaging lens system of the example 1 can use inexpensive plastic lenses except for the fourth lens that is immediately next to the aperture stop, thereby achieving price reduction.

Further, in the imaging lens system of the example 1, because the fourth lens that is immediately next to the aperture stop is a glass lens, variation in resolution due to out-of-focus caused by temperature change is reduced.

Lenses that constitute an optical system are classified into positive lenses that constitute an image-forming system and negative lenses that constitute a correction system. As is obvious from Table 3, the fourth lens has the shortest focal length and has the highest positive power among the positive lenses. By using glass, rather than plastic, for this highest-power lens, it is possible to appropriately avoid out-of-focus caused by temperature change in the entire optical system.

Further, the range of the Abbe number of an aspheric glass lens of the fourth lens preferably satisfies the following expression (4). By reducing chromatic dispersion in the fourth lens with the highest power, it is possible to improve the properties of the entire optical system.

$$\nu 4 \geq 53 \quad (4)$$

When the focal length of the fourth lens is f4 and the focal length of the entire lens optical system is f, it is preferred to satisfy the following expression (2).

$$2.8 < f4/f < 3.5 \quad (2)$$

When the upper limit of the expression (2) is exceeded, the correction of out-of-focus by the fourth lens is insufficient, and the MTF is degraded. On the other hand, when the lower limit of the expression (2) is exceeded, the correction of out-of-focus by the fourth lens is excessive, and the MTF is degraded. To make a more effective correction, it is preferred to satisfy the following expression (3).

$$2.9 < f4/f < 3.3 \quad (3)$$

Further, in the imaging lens system of the example 1, the fifth lens satisfies the following conditional expression (1), which prevents excessive chromatic aberration correction and thereby avoids the whole image degradation, and also prevents insufficient chromatic aberration correction and thereby avoids the whole image degradation as well.

$$-3.0 < f5/f < -2.2 \quad (1)$$

(f5 is the focal length of the fifth lens, and f is the focal length of the entire system)

Note that, when the lower limit of the above expression (1) is exceeded, the power of f5 increases and the chromatic aberration correction is excessive, which causes the whole image degradation. On the other hand, when the upper limit of the above expression (1) is exceeded, the power of f5 decreases and the chromatic aberration correction is insufficient, which also causes the whole image degradation.

Further, the F-number is small, which produces a bright lens. Furthermore, the lenses closer to the image than the fourth lens are less affected by spherical aberration and coma aberration.

Example 2: Imaging Lens System

Figure 3:
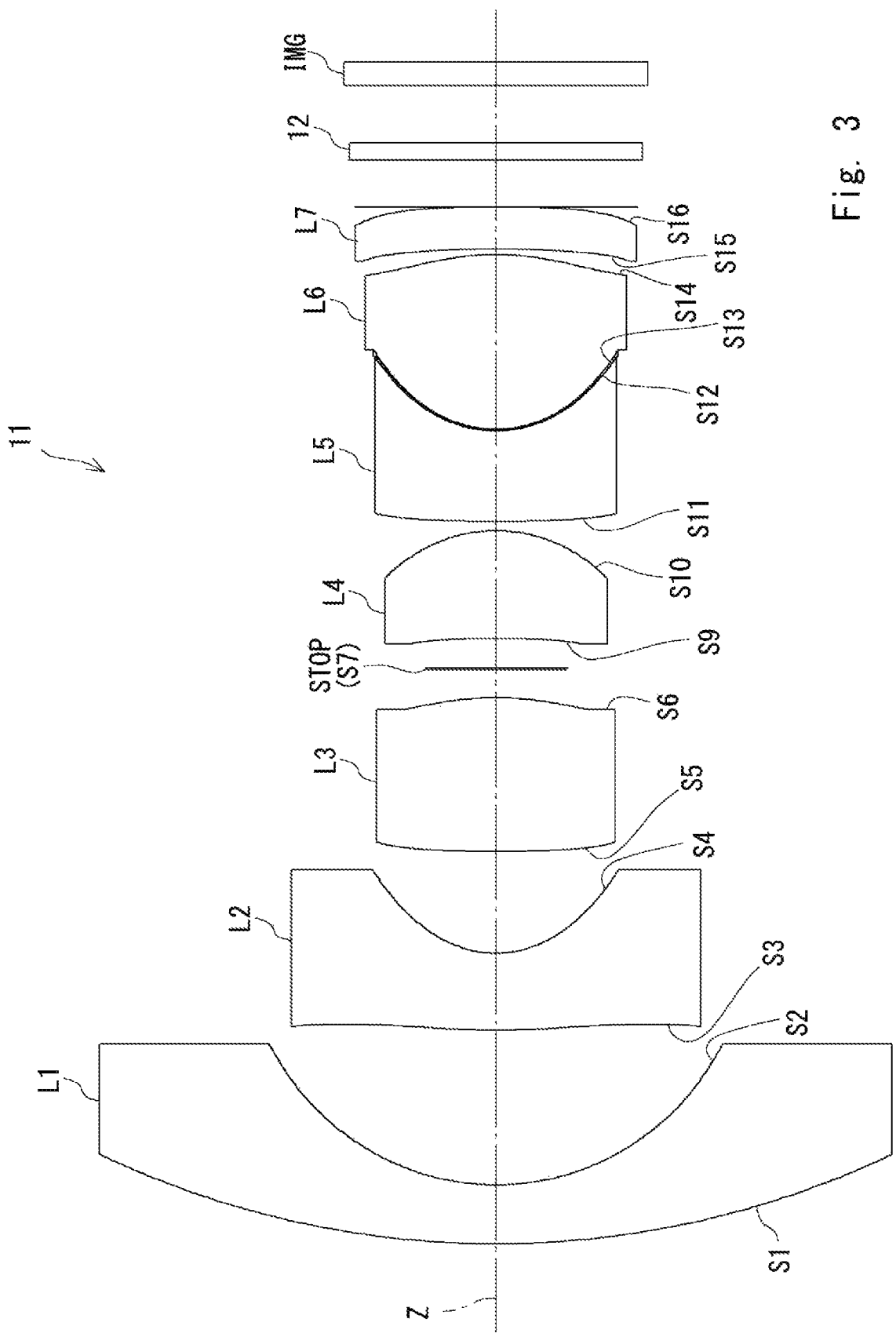
FIG. 3 is a sectional view of an imaging lens system according to an example 2.

FIG. 3 is a sectional view of an imaging lens system according to an example 2. In FIG. 3, the same elements as those in FIG. 1 are denoted by the same reference numerals, and the description thereof is omitted. In FIG. 3, an imaging lens system 11 includes, sequentially from the object side, a first lens L1 having a negative power and being concave on the image side, a second lens L2 having a negative power and being concave on the image side, a third lens L3 having a positive power and being convex on the object side, an aperture stop STOP, a fourth lens L4 having a positive power and being convex on the image side, a fifth lens L5, a sixth lens L6 whose object side is bonded to the image side of the fifth lens, and a seventh lens L7 having a negative power and being convex on the image side. Further, the imaging lens system 11 includes an IR cut filter 12. IMG indicates an imaging plane.

The property data of the imaging lens system 11 is described hereinafter.

First, Table 4 shows lens data of each lens surface in the imaging lens system 11. In Table 4, the curvature radius, the surface-to-surface distance, the refractive index, and the Abbe number are shown as lens data. The surface denoted by the symbol "*" indicates an aspheric surface.

TABLE 4

Lens Parameter

| | Curvature radius | Surface-to-surface distance | nd (Refractive index) | vd (Abbe number) | |
|---|---|---|---|---|---|
| 1st surface | 16.046 | 1.000 | 1.804 | 46.5 | |
| 2nd surface | 4.361 | 2.631 | | | |
| 3rd surface | 15.759 | 1.300 | 1.545 | 56.2 | * |
| 4th surface | 1.854 | 1.727 | | | * |
| 5th surface | 43.262 | 2.586 | 1.661 | 20.4 | * |
| 6th surface | −5.470 | 0.480 | | | * |
| (STOP) 7th surface | INFINITY | 0.030 | | | |
| 8th surface | INFINITY | 0.501 | | | |
| 9th surface | −24.265 | 1.819 | 1.553 | 71.7 | * |
| 10th surface | −2.522 | 0.155 | | | * |
| 11th surface | 40.846 | 1.539 | 1.661 | 20.4 | * |
| 12th surface | 2.178 | 0.020 | 1.502 | 51.0 | * |
| 13th surface | 2.178 | 2.951 | 1.545 | 56.2 | * |
| 14th surface | −3.950 | 0.100 | | | * |
| 15th surface | −11.430 | 0.705 | 1.545 | 56.2 | * |
| 16th surface | −67.293 | 0.100 | | | * |
| 17th surface | INFINITY | 0.700 | 1.517 | 64.2 | |
| 18th surface | INFINITY | 1.655 | | | |

Table 5 shows aspheric coefficients for defining the aspheric shape of an aspheric lens surface in the imaging lens system 11 of the example 2. In Table 5, "−6.522528E−03" means "$-6.522528 \times 10^{-3}$", for example.

TABLE 5

Aspheric coefficients

| | 3rd surface | 4th surface | 5th surface | 6th surface | 9th surface | 10th surface |
|---|---|---|---|---|---|---|
| k | 0.000000E+00 | −0.576599838 | 0 | 0.000000E+00 | 0.000000E+00 | −0.002225356 |
| α4 | −3.222183E−03 | 1.859319E−03 | 4.747473E−03 | 8.022545E−03 | −8.321899E−03 | 4.805045E−03 |
| α6 | 9.485620E−05 | −1.000232E−03 | −3.395912E−04 | −2.035585E−03 | −1.895069E−03 | −2.964869E−04 |
| α8 | −1.143585E−06 | 1.643372E−05 | 1.442903E−04 | 9.170244E−04 | −2.310353E−05 | 6.256485E−05 |
| α10 | −7.335783E−09 | 0.000000E+00 | 0.000000E+00 | −1.001551E−04 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α12 | 0.000000E+00 | 0.000000E+00 | 0.000000E+00 | 0.000000E+00 | 0.000000E+00 | 0.000000E+00 |

TABLE 5-continued

| Aspheric coefficients | | | | | |
|---|---|---|---|---|---|
| α16 | 0.000000E+00 | 0.000000E+00 | 0.000000E+00 | 0.000000E+00 | 0.000000E+00 | 0.000000E+00 |

| | 11th surface | 12th surface | 13th surface | 14th surface | 15th surface | 16th surface |
|---|---|---|---|---|---|---|
| k | 0 | −2.749379E−01 | −2.749379E−01 | 0 | 0.000000E+00 | 0 |
| α4 | 2.984886E−03 | 5.901228E−03 | 8.901228E−03 | 2.351106E−02 | 1.150292E−02 | −1.344924E−02 |
| α6 | 1.962828E−04 | −2.425862E−04 | −2.425862E−04 | −4.446172E−03 | −2.314576E−03 | 3.982074E−03 |
| α8 | 0.000000E+00 | −2.972174E−04 | −2.972174E−04 | 6.401528E−04 | 5.792500E−05 | −9.682540E−04 |
| α10 | 0.000000E+00 | 0.000000E+00 | 0.000000E+00 | −2.920476E−05 | 0.000000E+00 | 9.633928E−05 |
| α12 | 0.000000E+00 | 0.000000E+00 | 0.000000E+00 | 0.000000E+00 | 0.000000E+00 | −3.294368E−06 |
| α12 | 0.000000E+00 | 0.000000E+00 | 0.000000E+00 | 0.000000E+00 | 0.000000E+00 | 1.569481E−08 |
| α16 | 0.000000E+00 | 0.000000E+00 | 0.000000E+00 | 0.000000E+00 | 0.000000E+00 | 0.000000E+00 |

Figure 4A:
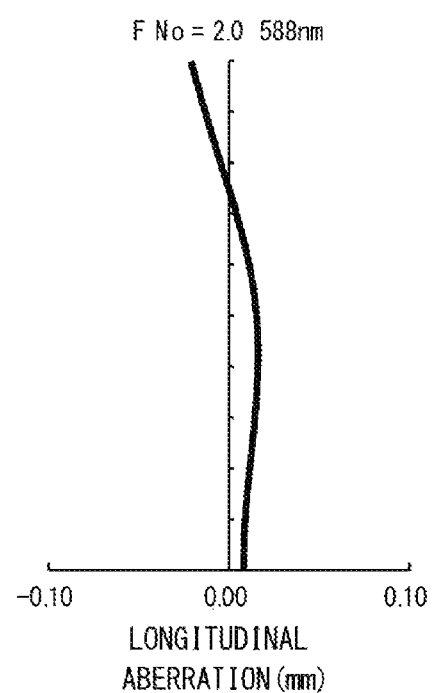
FIG. 4A is a longitudinal aberration diagram of the imaging lens system according to the example 2.
Figure 4B:
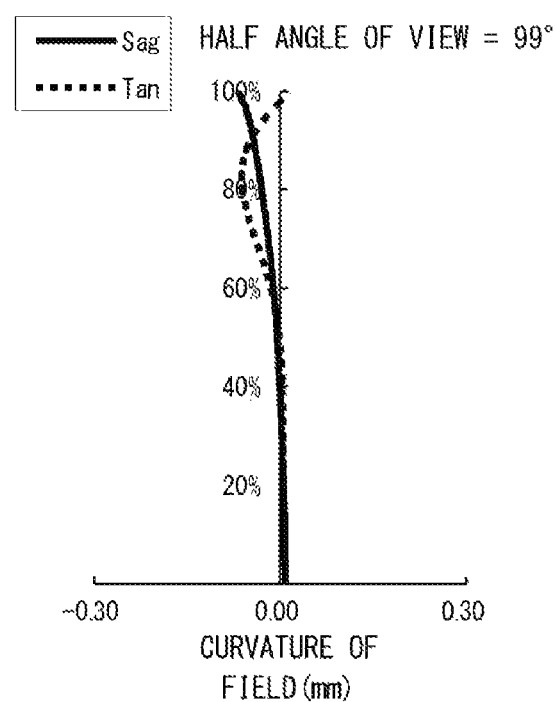
FIG. 4B is a field curvature diagram of the imaging lens system according to the example 2.
Figure 4C:
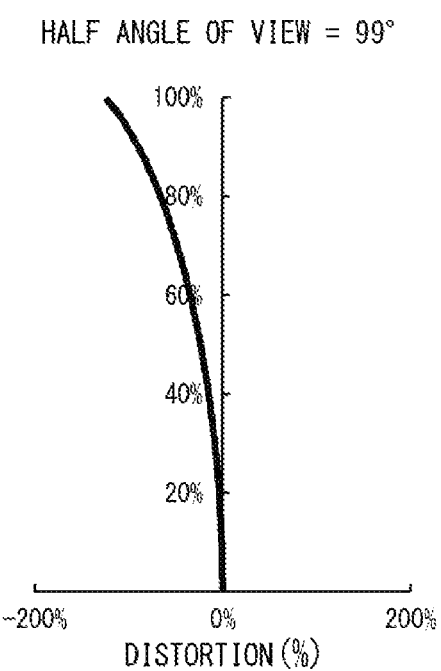
FIG. 4C is a distortion diagram of the imaging lens system according to the example 2.

FIG. 4A is a longitudinal aberration diagram of the imaging lens system in the example 2. FIG. 4B is a field curvature diagram of the imaging lens system in the example 2. FIG. 4C is a distortion diagram of the imaging lens system in the example 2. As shown in FIGS. 4A to 4C, the half angle of view is 99°, and the F-number is 2.0 in the imaging lens system 11 of the example 2. In the longitudinal aberration diagram of FIG. 4A, the horizontal axis indicates a position where a light ray intersects the optical axis Z, and the vertical axis indicates a height of pupil diameter.

In the field curvature diagram of FIG. 4B, the horizontal axis indicates a distance along the optical axis Z, and the vertical axis indicates the image height (angle of view). Further, in the field curvature diagram of FIG. 4B, Sag indicates the curvature of field on a sagittal plane, and Tan indicates the curvature of field on a tangential plane. As shown in the field curvature diagram of FIG. 4B, the curvature of field is corrected appropriately in the imaging lens system 11 of this example. The imaging lens system 11 thereby achieves a high resolution.

In the distortion diagram of FIG. 4C, the horizontal axis indicates the amount of distortion (%) of an image, and the vertical axis indicates the image height (angle of view). The field curvature diagram of FIG. 4B and the distortion diagram of FIG. 4C show results of simulation using a light ray with a wavelength of 588 nm.

Table 6 shows results of calculating property values of the imaging lens system 11 of the example 2. Table 6 shows the property values (a combined focal length $f_{12}$ of the first lens L1 and the second lens L2, a combined focal length $f_{23}$ of the second lens L2 and the third lens L3, a combined focal length $f_{34}$ of the third lens L3 and the fourth lens L4, a combined focal length $f_{45}$ of the fourth lens L4 and the fifth lens L5, a combined focal length $f_{56}$ of the fifth lens L5 and the sixth lens L6, and a combined focal length $f_{67}$ of the sixth lens L6 and the seventh lens L7), $f_4/f$, and $f_5/f$ when the focal length of the whole lens system is f, the focal length of the first lens L1 is $f_1$, the focal length of the second lens L2 is $f_2$, the focal length of the third lens L3 is $f_3$, the focal length of the fourth lens L4 is $f_4$, the focal length of the fifth lens L5 is $f_5$, the focal length of the sixth lens L6 is $f_6$, and the focal length of the seventh lens L7 is $f_7$ in the imaging lens system 11. Each focal length is calculated using a light ray with a wavelength of 588 nm.

TABLE 6

Example 2 Property

| Item | Value | Unit |
|---|---|---|
| F No | 2.0 | — |
| Optical length | 20.008 | mm |
| Whole system f | 1.601 | mm |
| $f_1$ | −7.742 | mm |
| $f_2$ | −3.987 | mm |
| $f_3$ | 7.508 | mm |
| $f_4$ | 4.940 | mm |
| $f_5$ | −3.538 | mm |
| $f_6$ | 6.553 | mm |
| $f_7$ | −25.372 | mm |
| $f_{12}$ | −2.040 | mm |
| $f_{23}$ | −60.081 | mm |
| $f_{34}$ | 3.713 | mm |
| $f_{45}$ | 6.223 | mm |
| $f_{56}$ | 9.137 | mm |
| $f_{67}$ | 8.716 | mm |
| $f_4/f$ | 3.086 | |
| $f_5/f$ | −2.21 | |

As described above, in the imaging lens system of the example 2, because the fourth lens that is immediately next to the aperture stop is a glass lens, it is possible to widely set the refractive index and the Abbe number and thereby facilitate the correction of aberrations, and therefore the lenses other than this lens can be plastic lenses, which makes it possible to simultaneously achieve a high resolution necessary for sensing, a size small enough to be mounted on a vehicle, and a low price. Further, in the imaging lens system of the example 2, the range of f4/f and the range of the Abbe number v4 of the fourth lens may be the same as those in the imaging lens system of the example 1. Further, the imaging lens system of the example 2 also has the same effects as the imaging lens system of the example 1.

Example 3: Imaging Lens System

Figure 5:
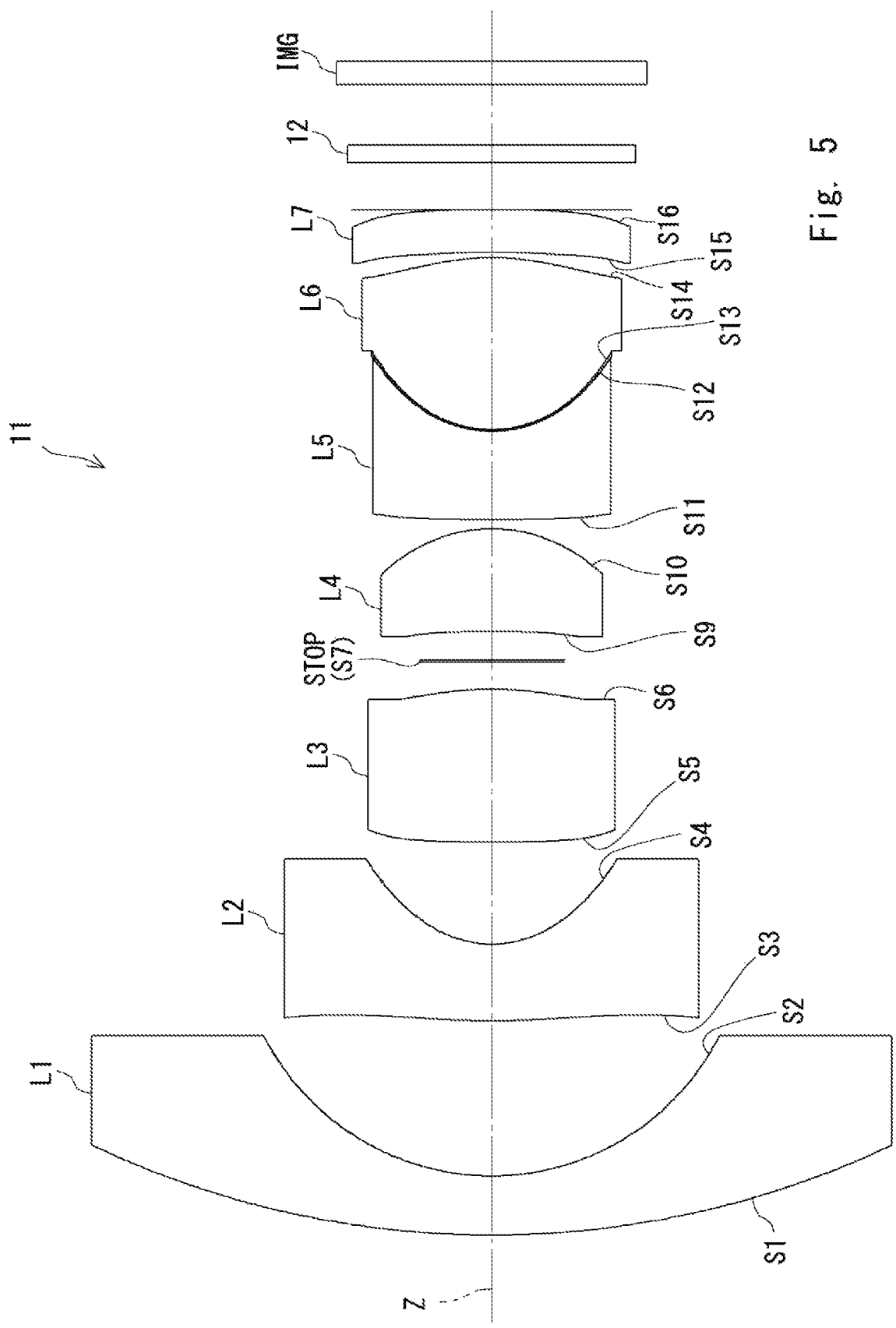
FIG. 5 is a sectional view of an imaging lens system according to an example 3.

FIG. 5 is a sectional view of an imaging lens system according to an example 3. In FIG. 5, the same elements as those in FIG. 1 are denoted by the same reference numerals, and the description thereof is omitted. In FIG. 5, an imaging lens system 11 includes, sequentially from the object side, a first lens L1 having a negative power and being concave on the image side, a second lens L2 having a negative power and being concave on the image side, a third lens L3 having a positive power and being convex on the object side, an aperture stop STOP, a fourth lens L4 having a positive power and being convex on the image side, a fifth lens L5, a sixth lens L6 whose object side is bonded to the image side of the fifth lens, and a seventh lens L7 having a negative power and being convex on the image side. Further, the imaging lens system 11 includes an IR cut filter 12. IMG indicates an imaging plane.

The property data of the imaging lens system 11 is described hereinafter.

First, Table 7 shows lens data of each lens surface in the imaging lens system 11. Table 7 shows lens data of each lens surface in the imaging lens system 11. In Table 7, the curvature radius, the surface-to-surface distance, the refractive index, and the Abbe number are shown as lens data. The surface denoted by the symbol "*" indicates an aspheric surface.

TABLE 7

| Lens Parameter | | | | |
|---|---|---|---|---|
| | Curvature radius | Surface-to-surface distance | nd (Refractive index) | vd (Abbe number) |
| 1st surface | 16.091 | 1.000 | 1.804 | 46.5 |
| 2nd surface | 4.351 | 2.656 | | |
| 3rd surface | 15.834 | 1.310 | 1.545 | 56.2 * |
| 4th surface | 1.852 | 1.736 | | * |
| 5th surface | 41.890 | 2.604 | 1.661 | 20.4 * |
| 6th surface | −5.305 | 0.463 | | * |
| (STOP) 7th surface | INFINITY | 0.030 | | |
| 8th surface | INFINITY | 0.490 | | |
| 9th surface | −24.301 | 1.754 | 1.553 | 71.7 * |
| 10th surface | −2.515 | 0.151 | | * |
| 11th surface | 62.000 | 1.508 | 1.661 | 20.4 * |
| 12th surface | 2.084 | 0.020 | 1.502 | 51.0 * |
| 13th surface | 2.084 | 2.933 | 1.545 | 56.2 * |
| 14th surface | −3.934 | 0.100 | | * |
| 15th surface | −11.687 | 0.724 | 1.545 | 56.2 * |
| 16th surface | −59.118 | 0.100 | | * |
| 17th surface | INFINITY | 0.700 | 1.517 | 64.2 |
| 18th surface | INFINITY | 1.721 | | |

Table 8 shows aspheric coefficients for defining the aspheric shape of an aspheric lens surface in the imaging lens system 11 of the example 3. In Table 8, "−6.522528E-03" means "$-6.522528 \times 10^{-3}$", for example.

TABLE 8

| Aspheric coefficients | | | | | | |
|---|---|---|---|---|---|---|
| | 3rd surface | 4th surface | 5th surface | 6th surface | 9th surface | 10th surface |
| k | 0.000000E+00 | 0 | 0 | 0.000000E+00 | 0.000000E+00 | 0 |
| α4 | −3.235388E−03 | −9.676759E−04 | 4.717586E−03 | −1.369659E−03 | −6.372799E−03 | −2.723250E−04 |
| α6 | 9.392779E−05 | 2.181954E−05 | −2.669468E−04 | 8.446096E−04 | −3.244233E−03 | 1.148788E−04 |
| α8 | −1.242726E−06 | 0.000000E+00 | 2.137388E−04 | −6.634946E−05 | 8.160340E−04 | 0.000000E+00 |
| α10 | −2.078379E−08 | 0.000000E+00 | 0.000000E+00 | 0.000000E+00 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α16 | 0.000000E+00 | 0.000000E+00 | 0.000000E+00 | 0.000000E+00 | 0.000000E+00 | 0.000000E+00 |
| | 11th surface | 12th surface | 13th surface | 14th surface | 15th surface | 16th surface |
| k | 0 | 0.000000E+00 | −2.640209E−01 | 0 | 0.000000E+00 | 0 |
| α4 | 3.038881E−03 | 0.000000E+00 | 8.842468E−03 | −4.452736E−03 | 1.150292E−02 | 3.976450E−03 |
| α6 | 2.117974E−04 | 0.000000E+00 | −2.580951E−04 | 6.390497E−04 | −2.307742E−03 | −9.688395E−04 |
| α8 | 0.000000E+00 | 5.842468E−03 | −3.234701E−04 | −2.934837E−05 | 5.902903E−05 | 9.622089E−05 |
| α10 | 0.000000E+00 | −2.580951E−04 | 0.000000E+00 | 0.000000E+00 | 0.000000E+00 | −3.312714E−06 |
| α12 | 0.000000E+00 | −3.234701E−04 | 0.000000E+00 | 0.000000E+00 | 0.000000E+00 | 1.282349E−08 |
| α12 | 0.000000E+00 | 0.000000E+00 | 0.000000E+00 | 0.000000E+00 | 0.000000E+00 | 0.000000E+00 |
| α16 | 0.000000E+00 | 0.000000E+00 | 0.000000E+00 | 0.000000E+00 | 0.000000E+00 | 0.000000E+00 |

Figure 6A:
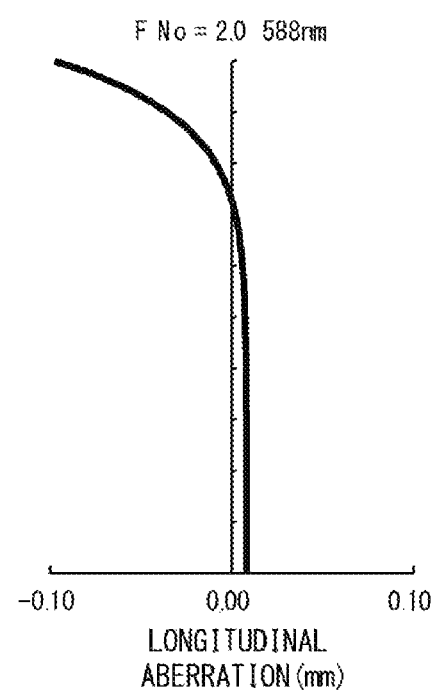
FIG. 6A is a longitudinal aberration diagram of the imaging lens system according to the example 3.
Figure 6B:
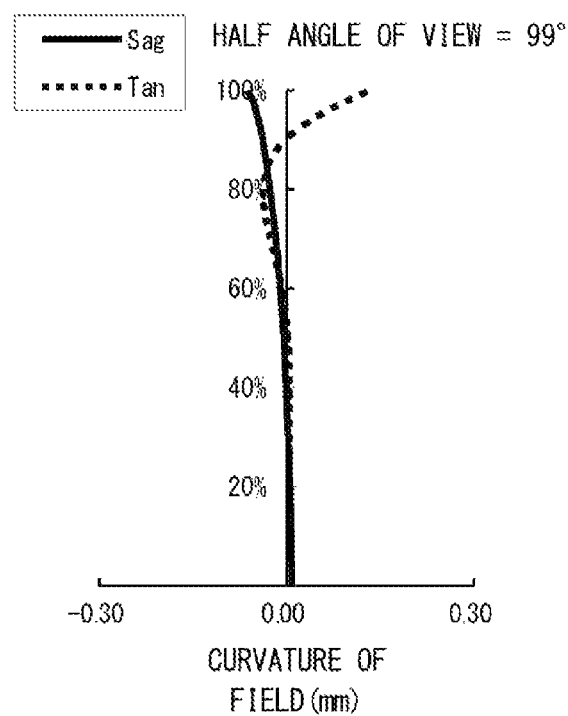
FIG. 6B is a field curvature diagram of the imaging lens system according to the example 3.
Figure 6C:
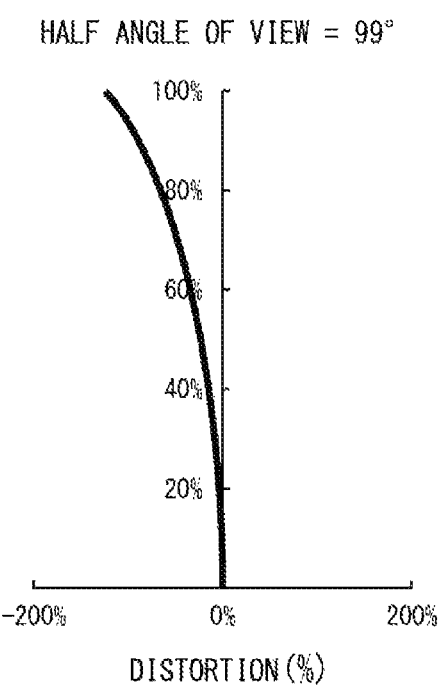
FIG. 6C is a distortion diagram of the imaging lens system according to the example 3.

FIG. 6A is a longitudinal aberration diagram of the imaging lens system in the example 3. FIG. 6B is a field curvature diagram of the imaging lens system in the example 3. FIG. 6C is a distortion diagram of the imaging lens system in the example 3. As shown in FIGS. 6A to 6C, the half angle of view is 99°, and the F-number is 2.0 in the imaging lens system 11 of the example 3. In the longitudinal aberration diagram of FIG. 6A, the horizontal axis indicates a position where a light ray intersects the optical axis Z, and the vertical axis indicates a height of pupil diameter.

In the field curvature diagram of FIG. 6B, the horizontal axis indicates a distance along the optical axis Z, and the vertical axis indicates the image height (angle of view). Further, in the field curvature diagram of FIG. 6B, Sag indicates the curvature of field on a sagittal plane, and Tan indicates the curvature of field on a tangential plane. As shown in the field curvature diagram of FIG. 6B, the curvature of field is corrected appropriately in the imaging lens system 11 of this example. The imaging lens system 11 thereby achieves a high resolution.

In the distortion diagram of FIG. 6C, the horizontal axis indicates the amount of distortion (%) of an image, and the vertical axis indicates the image height (angle of view). The field curvature diagram of FIG. 6B and the distortion diagram of FIG. 6C show results of simulation using a light ray with a wavelength of 588 nm.

Table 9 shows results of calculating property values of the imaging lens system 11 of the example 3. Table 9 shows the property values (a combined focal length $f_{12}$ of the first lens L1 and the second lens L2, a combined focal length $f_{23}$ of the second lens L2 and the third lens L3, a combined focal length $f_{34}$ of the third lens L3 and the fourth lens L4, a combined focal length $f_{45}$ of the fourth lens L4 and the fifth lens L5, a combined focal length $f_{56}$ of the fifth lens L5 and the sixth lens L6, and a combined focal length $f_{67}$ of the sixth lens L6 and the seventh lens L7), $f_4/f$, and $f_5/f$ when the focal length of the whole lens system is f, the focal length of the first lens L1 is $f_1$, the focal length of the second lens L2 is $f_2$, the focal length of the third lens L3 is $f_3$, the focal length of the fourth lens L4 is $f_4$, the focal length of the fifth lens L5 is $f_5$, the focal length of the sixth lens L6 is $f_6$, and the focal length of the seventh lens L7 is $f_7$ in the imaging lens system 11. Each focal length is calculated using a light ray with a wavelength of 588 nm.

TABLE 9

Example 3 Property

| Item | Value | Unit |
|---|---|---|
| F No | 2.0 | — |
| Optical length | 21.008 | mm |
| Whole system f | 1.614 | mm |
| $f_1$ | −7.707 | mm |
| $f_2$ | −3.978 | mm |
| $f_3$ | 7.286 | mm |
| $f_4$ | 4.928 | mm |
| $f_5$ | −3.296 | mm |
| $f_6$ | 6.500 | mm |
| $f_7$ | −26.867 | mm |
| $f_{12}$ | −2.028 | mm |
| $f_{23}$ | −109.038 | mm |
| $f_{34}$ | 3.654 | mm |
| $f_{45}$ | 6.559 | mm |
| $f_{56}$ | 9.551 | mm |
| $f_{67}$ | 8.475 | mm |
| $f_4/f$ | 3.054 | |
| $f_5/f$ | −2.04 | |

As described above, in the imaging lens system of the example 3, because the fourth lens that is immediately next to the aperture stop is a glass lens, it is possible to widely set the refractive index and the Abbe number and thereby facilitate the correction of aberrations, and therefore the lenses other than this lens can be plastic lenses, which makes it possible to simultaneously achieve a high resolution necessary for sensing, a size small enough to be mounted on a vehicle, and a low price. Further, in the imaging lens system of the example 3, the range of f4/f and the range of the Abbe number v4 of the fourth lens may be the same as those in the imaging lens system of the example 1. Further, the imaging lens system of the example 3 also has the same effects as the imaging lens system of the example 1.

Example 4: Imaging Lens System

Figure 7:
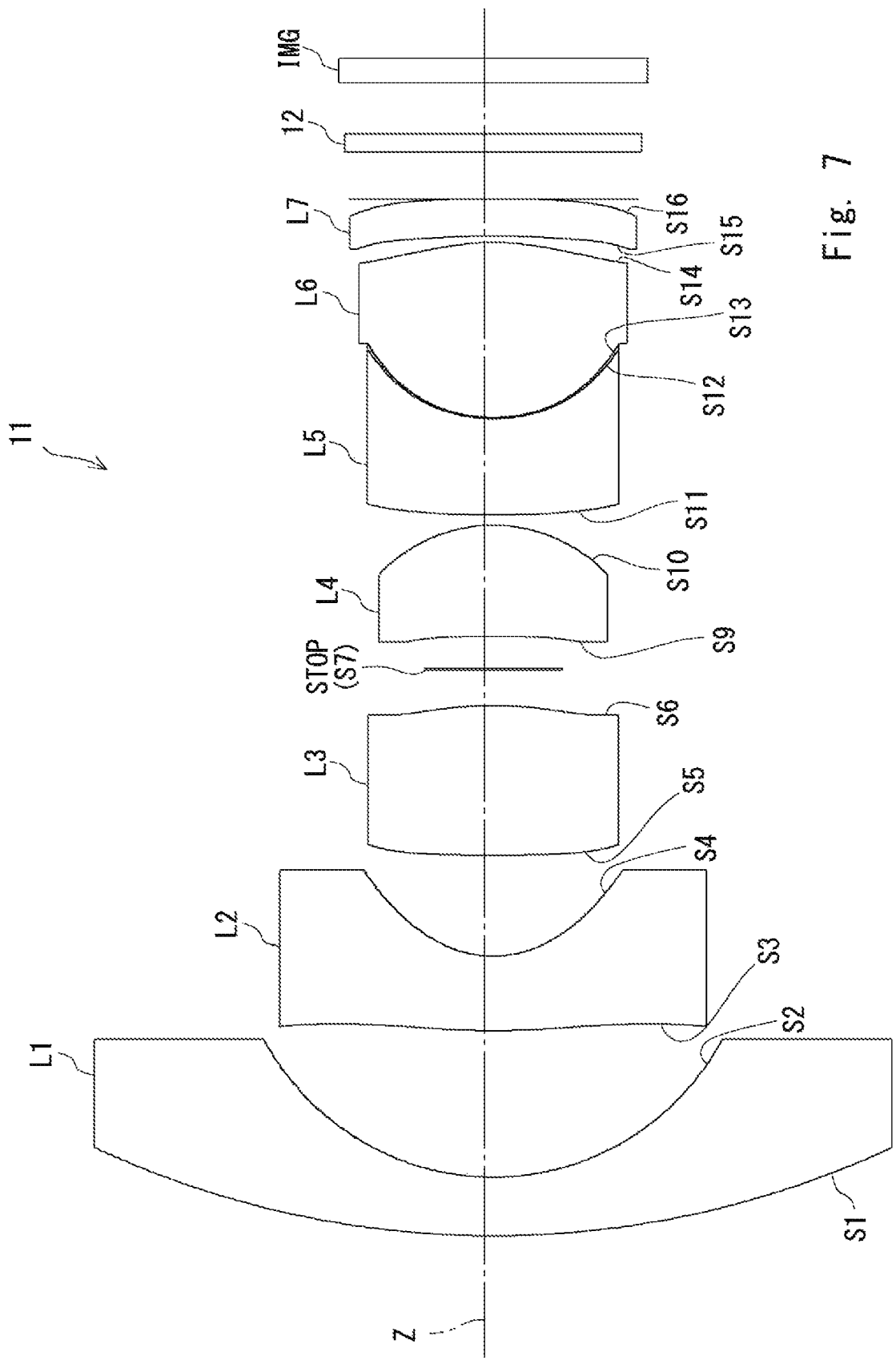
FIG. 7 is a sectional view of an imaging lens system according to an example 4.

FIG. 7 is a sectional view of an imaging lens system according to an example 4. In FIG. 7, the same elements as those in FIG. 1 are denoted by the same reference numerals, and the description thereof is omitted. In FIG. 7, an imaging lens system 11 includes, sequentially from the object side, a first lens L1 having a negative power and being concave on the image side, a second lens L2 having a negative power and being concave on the image side, a third lens L3 having a positive power and being convex on the object side, an aperture stop STOP, a fourth lens L4 having a positive power and being convex on the image side, a fifth lens L5, a sixth lens L6 whose object side is bonded to the image side of the fifth lens, and a seventh lens L7 having a negative power and being convex on the image side. Further, the imaging lens system 11 includes an IR cut filter 12. IMG indicates an imaging plane.

The property data of the imaging lens system 11 is described hereinafter.

First, Table 10 shows lens data of each lens surface in the imaging lens system 11. In Table 10, the curvature radius, the surface-to-surface distance, the refractive index, and the Abbe number are shown as lens data. The surface denoted by the symbol "*" indicates an aspheric surface.

TABLE 10

Lens Parameter

| | Curvature radius | Surface-to-surface distance | nd (Refractive index) | vd (Abbe number) | |
|---|---|---|---|---|---|
| 1st surface | 15.926 | 1.000 | 1.804 | 46.5 | |
| 2nd surface | 4.392 | 2.503 | | | |
| 3rd surface | 15.558 | 1.258 | 1.545 | 56.2 | * |
| 4th surface | 1.866 | 1.706 | | | * |
| 5th surface | 41.164 | 2.546 | 1.661 | 20.4 | * |
| 6th surface | −6.362 | 0.604 | | | * |
| (STOP) 7th surface | INFINITY | 0.030 | | | |
| 8th surface | INFINITY | 0.547 | | | |
| 9th surface | −22.285 | 1.881 | 1.553 | 71.7 | * |
| 10th surface | −2.538 | 0.178 | | | * |
| 11th surface | 21.821 | 1.623 | 1.661 | 20.4 | * |
| 12th surface | 2.667 | 0.020 | 1.502 | 51.0 | * |
| 13th surface | 2.667 | 2.987 | 1.545 | 56.2 | * |
| 14th surface | −3.990 | 0.100 | | | * |
| 15th surface | −10.782 | 0.630 | 1.545 | 56.2 | * |
| 16th surface | −81.142 | 0.100 | | | * |
| 17th surface | INFINITY | 0.700 | 1.517 | 64.2 | |
| 18th surface | INFINITY | 1.591 | | | |

Table 11 shows aspheric coefficients for defining the aspheric shape of an aspheric lens surface in the imaging lens system 11 of the example 4. In Table 11, "−6.522528E-03" means "−6.522528×10$^{-3}$", for example.

TABLE 11

Aspheric coefficients

| | 3rd surface | 4th surface | 5th surface | 6th surface | 9th surface | 10th surface |
|---|---|---|---|---|---|---|
| k | 0.000000E+00 | 0 | 0 | 0.000000E+00 | 0.000000E+00 | 0 |
| $\alpha 4$ | −3.197780E−03 | −1.120732E−03 | 5.290403E−03 | −1.941496E−03 | −8.349588E−03 | −3.707933E−04 |
| $\alpha 6$ | 9.538701E−05 | 6.486319E−07 | −2.422918E−04 | 1.071738E−03 | −7.695661E−04 | 3.980456E−05 |
| $\alpha 8$ | −1.073952E−06 | 0.000000E+00 | 1.065674E−04 | −1.406919E−04 | −3.380581E−04 | 0.000000E+00 |
| $\alpha 10$ | −1.120887E−08 | 0.000000E+00 | 0.000000E+00 | 0.000000E+00 | 0.000000E+00 | 0.000000E+00 |
| $\alpha 12$ | 0.000000E+00 | 0.000000E+00 | 0.000000E+00 | 0.000000E+00 | 0.000000E+00 | 0.000000E+00 |
| $\alpha 12$ | 0.000000E+00 | 0.000000E+00 | 0.000000E+00 | 0.000000E+00 | 0.000000E+00 | 0.000000E+00 |
| $\alpha 16$ | 0.000000E+00 | 0.000000E+00 | 0.000000E+00 | 0.000000E+00 | 0.000000E+00 | 0.000000E+00 |

| | 11th surface | 12th surface | 13th surface | 14th surface | 15th surface | 16th surface |
|---|---|---|---|---|---|---|
| k | 0 | 0.000000E+00 | −1.456028E−01 | 0 | 0.000000E+00 | 0 |
| $\alpha 4$ | 2.734196E−03 | 0.000000E+00 | 1.059262E−02 | −4.436244E−03 | 1.150292E−02 | 3.996097E−03 |
| $\alpha 6$ | 1.910585E−04 | 0.000000E+00 | 1.660877E−04 | 6.349932E−04 | −2.328558E−03 | −9.678182E−04 |
| $\alpha 8$ | 0.000000E+00 | 7.592624E−03 | 2.890619E−05 | −3.089137E−05 | 5.967373E−05 | 9.603144E−05 |
| $\alpha 10$ | 0.000000E+00 | 1.660877E−04 | 0.000000E+00 | 0.000000E+00 | 0.000000E+00 | −3.347762E−06 |
| $\alpha 12$ | 0.000000E+00 | 2.890619E−05 | 0.000000E+00 | 0.000000E+00 | 0.000000E+00 | 3.844783E−09 |
| $\alpha 12$ | 0.000000E+00 | 0.000000E+00 | 0.000000E+00 | 0.000000E+00 | 0.000000E+00 | 0.000000E+00 |
| $\alpha 16$ | 0.000000E+00 | 0.000000E+00 | 0.000000E+00 | 0.000000E+00 | 0.000000E+00 | 0.000000E+00 |

Figure 8A:
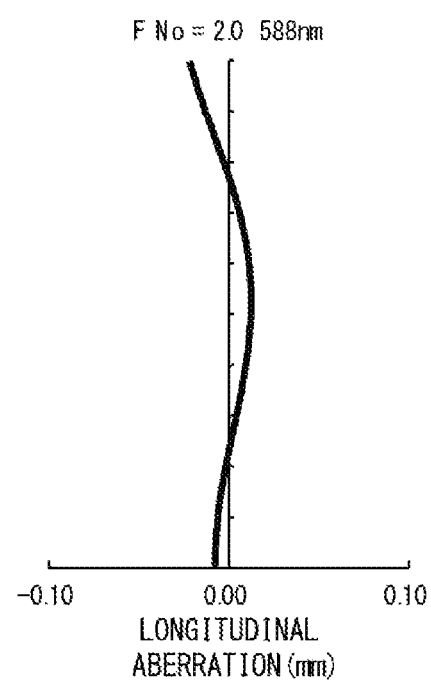
FIG. 8A is a longitudinal aberration diagram of the imaging lens system according to the example 4.
Figure 8B:
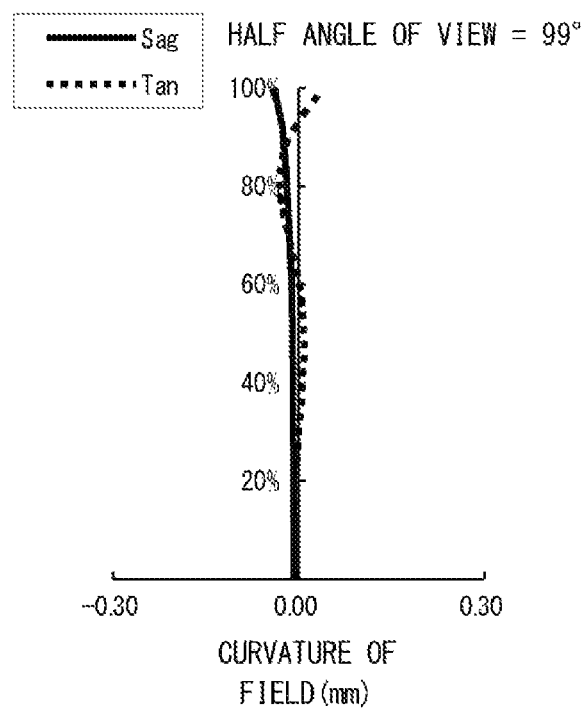
FIG. 8B is a field curvature diagram of the imaging lens system according to the example 4.
Figure 8C:
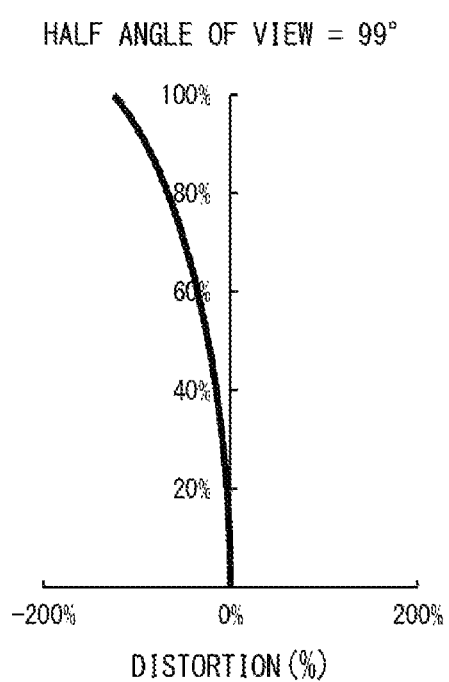
FIG. 8C is a distortion diagram of the imaging lens system according to the example 4.

FIG. 8A is a longitudinal aberration diagram of the imaging lens system in the example 4. FIG. 8B is a field curvature diagram of the imaging lens system in the example 4. FIG. 8C is a distortion diagram of the imaging lens system in the example 4. As shown in FIGS. 8A to 8C, the half angle of view is 99°, and the F-number is 2.0 in the imaging lens system 11 of the example 4. In the longitudinal aberration diagram of FIG. 8A, the horizontal axis indicates a position where a light ray intersects the optical axis Z, and the vertical axis indicates a height of pupil diameter.

In the field curvature diagram of FIG. 8B, the horizontal axis indicates a distance along the optical axis Z, and the vertical axis indicates the image height (angle of view). Further, in the field curvature diagram of FIG. 8B, Sag indicates the curvature of field on a sagittal plane, and Tan indicates the curvature of field on a tangential plane. As shown in the field curvature diagram of FIG. 8B, the curvature of field is corrected appropriately in the imaging lens system 11 of this example. The imaging lens system 11 thereby achieves a high resolution.

In the distortion diagram of FIG. 8C, the horizontal axis indicates the amount of distortion (%) of an image, and the vertical axis indicates the image height (angle of view). The field curvature diagram of FIG. 8B and the distortion diagram of FIG. 8C show results of simulation using a light ray with a wavelength of 588 nm.

Table 12 shows results of calculating property values of the imaging lens system 11 of the example 4. Table 12 shows the property values (a combined focal length $f_{12}$ of the first lens L1 and the second lens L2, a combined focal length $f_{23}$ of the second lens L2 and the third lens L3, a combined focal length $f_{34}$ of the third lens L3 and the fourth lens L4, a combined focal length $f_{45}$ of the fourth lens L4 and the fifth lens L5, a combined focal length $f_{56}$ of the fifth lens L5 and the sixth lens L6, and a combined focal length $f_{67}$ of the sixth lens L6 and the seventh lens L7), $f_4/f$, and $f_5/f$ when the focal length of the whole lens system is f, the focal length of the first lens L1 is $f_1$, the focal length of the second lens L2 is $f_2$, the focal length of the third lens L3 is $f_3$, the focal length of the fourth lens L4 is $f_4$, the focal length of the fifth lens L5 is $f_5$, the focal length of the sixth lens L6 is $f_6$, and the focal length of the seventh lens L7 is $f_7$ in the imaging lens system 11. Each focal length is calculated using a light ray with a wavelength of 588 nm.

TABLE 12

Example 4 Property

| Item | Value | Unit |
|---|---|---|
| F No | 2.0 | — |
| Optical length | 18.003 | mm |
| Whole system f | 1.566 | mm |
| $f_1$ | −7.845 | mm |
| $f_2$ | −4.020 | mm |
| $f_3$ | 8.521 | mm |
| $f_4$ | 5.007 | mm |
| $f_5$ | −4.759 | mm |
| $f_6$ | 6.732 | mm |
| $f_7$ | −22.882 | mm |
| $f_{12}$ | −2.088 | mm |
| $f_{23}$ | −22.055 | mm |
| $f_{34}$ | 3.945 | mm |
| $f_{45}$ | 5.435 | mm |
| $f_{56}$ | 8.068 | mm |
| $f_{67}$ | 9.394 | mm |
| $f_4/f$ | 3.198 | |
| $f_5/f$ | −3.04 | |

As described above, in the imaging lens system of the example 4, because the fourth lens that is immediately next to the aperture stop is a glass lens, it is possible to widely set the refractive index and the Abbe number and thereby facilitate the correction of aberrations, and therefore the lenses other than this lens can be plastic lenses, which makes it possible to simultaneously achieve a high resolution necessary for sensing, a size small enough to be mounted on a vehicle, and a low price. Further, in the imaging lens system of the example 4, the range of f4/f and the range of the Abbe number v4 of the fourth lens may be the same as those in the imaging lens system of the example 1. Further, the imaging lens system of the example 4 also has the same effects as the imaging lens system of the example 1.

Example 5: Imaging Lens System

Figure 9:
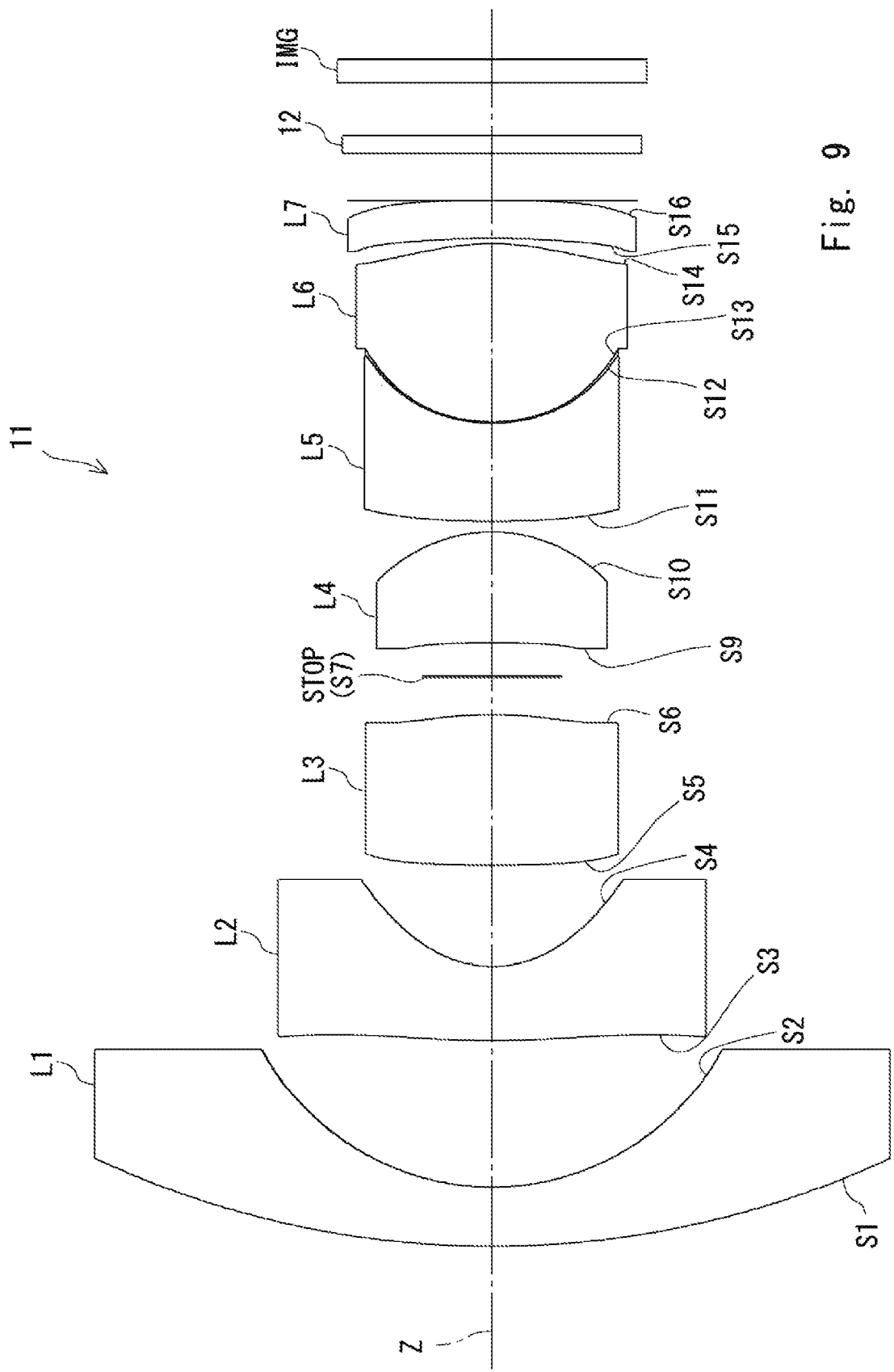
FIG. 9 is a sectional view of an imaging lens system according to an example 5.

FIG. 9 is a sectional view of an imaging lens system according to an example 5. In FIG. 9, an imaging lens system 11 includes, sequentially from the object side, a first lens L1 having a negative power and being concave on the image side, a second lens L2 having a negative power and being concave on the image side, a third lens L3 having a positive power and being convex on the object side, an aperture stop STOP, a fourth lens L4 having a positive power and being convex on the image side, a fifth lens L5, a sixth lens L6 whose object side is bonded to the image side of the fifth lens, and a seventh lens L7 having a negative power and being convex on the image side. Further, the imaging lens system 11 includes an IR cut filter 12. IMG indicates an imaging plane.

The property data of the imaging lens system 11 is described hereinafter.

First, Table 13 shows lens data of each lens surface in the imaging lens system 11. In Table 13, the curvature radius, the surface-to-surface distance, the refractive index, and the Abbe number are shown as lens data. The surface denoted by the symbol "*" indicates an aspheric surface.

TABLE 13

Lens Parameter

| | Curvature radius | Surface-to-surface distance | nd (Refractive index) | vd (Abbe number) | |
|---|---|---|---|---|---|
| 1st surface | 15.907 | 1.000 | 1.804 | 46.5 | |
| 2nd surface | 4.399 | 2.475 | | | |

TABLE 13-continued

Lens Parameter

| | Curvature radius | Surface-to-surface distance | nd (Refractive index) | vd (Abbe number) | |
|---|---|---|---|---|---|
| 3rd surface | 15.517 | 1.250 | 1.545 | 56.2 | * |
| 4th surface | 1.868 | 1.702 | | | * |
| 5th surface | 40.237 | 2.536 | 1.661 | 20.4 | * |
| 6th surface | −6.709 | 0.622 | | | * |
| (STOP) 7th surface | INFINITY | 0.030 | | | |
| 8th surface | INFINITY | 0.560 | | | |
| 9th surface | −21.799 | 1.863 | 1.553 | 71.7 | * |
| 10th surface | −2.541 | 0.184 | | | * |
| 11th surface | 19.877 | 1.645 | 1.661 | 20.4 | * |
| 12th surface | 2.818 | 0.020 | 1.502 | 51.0 | * |
| 13th surface | 2.818 | 2.995 | 1.545 | 56.2 | * |
| 14th surface | −3.999 | 0.100 | | | * |
| 15th surface | −10.662 | 0.630 | 1.545 | 56.2 | * |
| 16th surface | −86.200 | 0.100 | | | * |
| 17th surface | INFINITY | 0.700 | 1.517 | 64.2 | |
| 18th surface | INFINITY | 1.592 | | | |

Table 14 shows aspheric coefficients for defining the aspheric shape of an aspheric lens surface in the imaging lens system 11 of the example 5. In Table 14, "−6.522528E−03" means "$-6.522528 \times 10^{-3}$", for example.

TABLE 14

Aspheric coefficients

| | 3rd surface | 4th surface | 5th surface | 6th surface | 9th surface | 10th surface |
|---|---|---|---|---|---|---|
| k | 0.000000E+00 | −0.5946923 | 0 | 0.000000E+00 | 0.000000E+00 | −0.007678857 |
| α4 | −3.193416E−03 | 1.097151E−03 | 5.392646E−03 | 8.431665E−03 | −8.000093E−03 | 5.197852E−03 |
| α6 | 9.554737E−05 | −1.140715E−03 | −2.128120E−04 | −1.865906E−03 | −7.418117E−04 | −4.336630E−04 |
| α8 | −1.084261E−06 | −2.692835E−06 | 1.109395E−04 | 1.096699E−03 | −3.789986E−04 | 4.248710E−05 |
| α10 | −1.623670E−08 | 0.000000E+00 | 0.000000E+00 | −1.324815E−04 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α12 | 0.000000E+00 | 0.000000E+00 | 0.000000E+00 | 0.000000E+00 | 0.000000E+00 | 0.000000E+00 |
| α16 | 0.000000E+00 | 0.000000E+00 | 0.000000E+00 | 0.000000E+00 | 0.000000E+00 | 0.000000E+00 |

| | 11th surface | 12th surface | 13th surface | 14th surface | 15th surface | 16th surface |
|---|---|---|---|---|---|---|
| k | 0 | −1.112244E−01 | −1.112244E−01 | 0 | 0.000000E+00 | 0 |
| α4 | 2.699705E−03 | 7.904455E−03 | 1.090446E−02 | 2.373828E−02 | 1.150292E−02 | −1.317595E−02 |
| α6 | 2.101115E−04 | 2.555279E−04 | 2.555279E−04 | −4.431287E−03 | −2.334855E−03 | 4.001070E−03 |
| α8 | 0.000000E+00 | 6.614624E−05 | 6.614624E−05 | 6.352887E−04 | 5.910769E−05 | −9.673882E−04 |
| α10 | 0.000000E+00 | 0.000000E+00 | 0.000000E+00 | −3.096743E−05 | 0.000000E+00 | 9.604736E−05 |
| α12 | 0.000000E+00 | 0.000000E+00 | 0.000000E+00 | 0.000000E+00 | 0.000000E+00 | −3.354162E−06 |
| α12 | 0.000000E+00 | 0.000000E+00 | 0.000000E+00 | 0.000000E+00 | 0.000000E+00 | 1.175249E−09 |
| α16 | 0.000000E+00 | 0.000000E+00 | 0.000000E+00 | 0.000000E+00 | 0.000000E+00 | 0.000000E+00 |

Figure 10A:
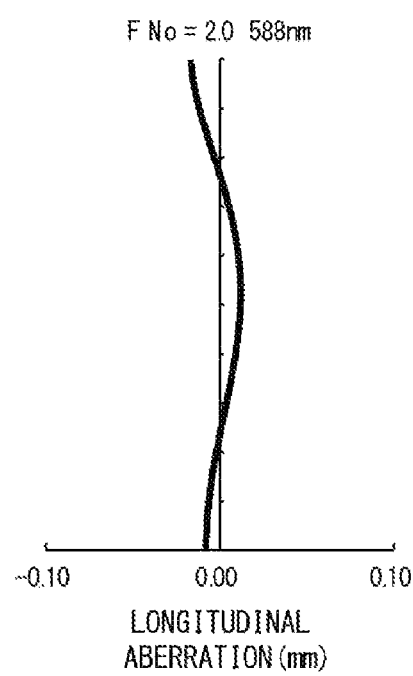
FIG. 10A is a longitudinal aberration diagram of the imaging lens sy stem according to the example 5.
Figure 10B:
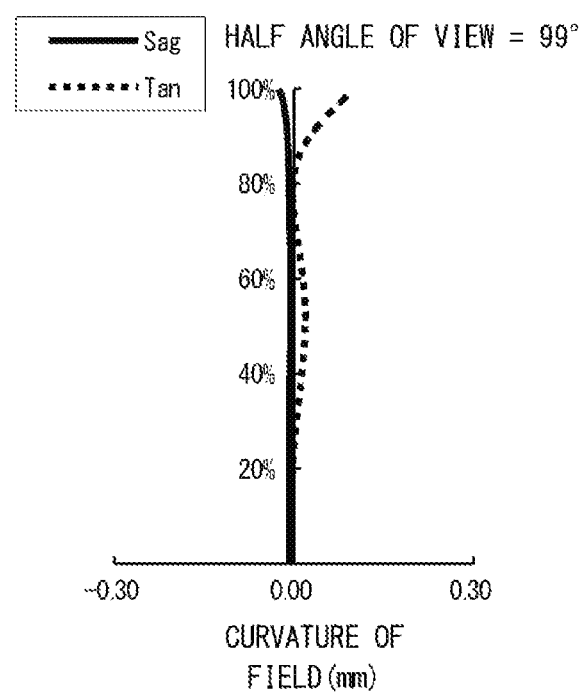
FIG. 10B is a field curvature diagram of the imaging lens system according to the example 5.
Figure 10C:
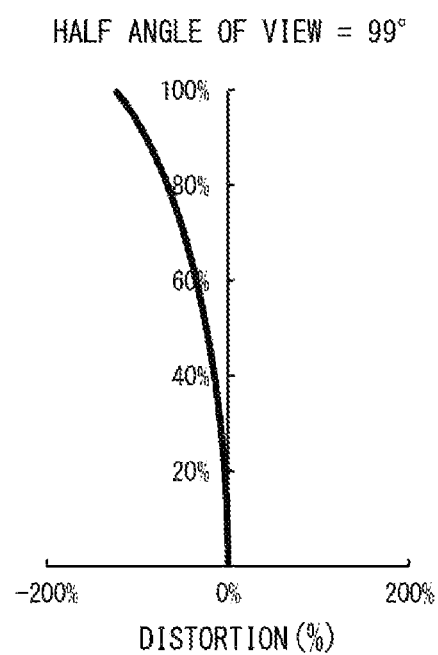
FIG. 10C is a distortion diagram of the imaging lens system according to the example 5.

FIG. 10A is a longitudinal aberration diagram of the imaging lens system in the example 5. FIG. 10B is a field curvature diagram of the imaging lens system in the example 5. FIG. 10C is a distortion diagram of the imaging lens system in the example 5. As shown in FIGS. 10A to 10C, the half angle of view is 99°, and the F-number is 2.0 in the imaging lens system 11 of the example 5. In the longitudinal aberration diagram of FIG. 10A, the horizontal axis indicates a position where a light ray intersects the optical axis Z, and the vertical axis indicates a height of pupil diameter.

In the field curvature diagram of FIG. 10B, the horizontal axis indicates a distance along the optical axis Z, and the vertical axis indicates the image height (angle of view). Further, in the field curvature diagram of FIG. 10B, Sag indicates the curvature of field on a sagittal plane, and Tan indicates the curvature of field on a tangential plane. As shown in the field curvature diagram of FIG. 10B, the curvature of field is corrected appropriately in the imaging lens system 11 of this example. The imaging lens system 11 thereby achieves a high resolution.

In the distortion diagram of FIG. 10C, the horizontal axis indicates the amount of distortion (%) of an image, and the vertical axis indicates the image height (angle of view). The field curvature diagram of FIG. 10B and the distortion diagram of FIG. 10C show results of simulation using a light ray with a wavelength of 588 nm.

Table 15 shows results of calculating property values of the imaging lens system 11 of the example 5. Table 15 shows the property values (a combined focal length $f_{12}$ of the first lens L1 and the second lens L2, a combined focal length $f_{23}$ of the second lens L2 and the third lens L3, a combined focal length $f_{34}$ of the third lens L3 and the fourth lens L4, a combined focal length $f_{45}$ of the fourth lens L4 and the fifth lens L5, a combined focal length $f_{56}$ of the fifth lens L5 and the sixth lens L6, and a combined focal length $f_{67}$ of the sixth lens L6 and the seventh lens L7), $f_4/f$, and $f_5/f$ when the focal length of the whole lens system is f, the focal length of the first lens L1 is $f_1$, the focal length of the second lens L2 is $f_2$, the focal length of the third lens L3 is $f_3$, the focal length of the fourth lens L4 is $f_4$, the focal length of the fifth lens L5 is $f_5$, the focal length of the sixth lens L6 is $f_6$, and the focal length of the seventh lens L7 is $f_7$ in the imaging lens system 11. Each focal length is calculated using a light ray with a wavelength of 588 nm.

TABLE 15

Example 5 Property

| Item | Value | Unit |
| --- | --- | --- |
| F No | 2.0 | — |
| Optical length | 20.004 | mm |
| Whole system f | 1.561 | mm |
| $f_1$ | −7.865 | mm |
| $f_2$ | −4.026 | mm |
| $f_3$ | 8.894 | mm |
| $f_4$ | 5.026 | mm |
| $f_5$ | −5.168 | mm |
| $f_6$ | 6.775 | mm |
| $f_7$ | −22.386 | mm |
| $f_{12}$ | −2.098 | mm |
| $f_{23}$ | −18.434 | mm |
| $f_{34}$ | 4.001 | mm |
| $f_{45}$ | 5.293 | mm |
| $f_{56}$ | 7.866 | mm |
| $f_{67}$ | 9.566 | mm |
| $f_4/f$ | 3.219 | |
| $f_5/f$ | −3.31 | |

As described above, in the imaging lens system of the example 5, because the fourth lens that is immediately next to the aperture stop is a glass lens, it is possible to widely set the refractive index and the Abbe number and thereby facilitate the correction of aberrations, and therefore the lenses other than this lens can be plastic lenses, which makes it possible to simultaneously achieve a high resolution necessary for sensing, a size small enough to be mounted on a vehicle, and a low price. Further, in the imaging lens system of the example 2, the range of f4/f and the range of the Abbe number v4 of the fourth lens may be the same as those in the imaging lens system of the example 1. Further, the imaging lens system of the example 2 also has the same effects as the imaging lens system of the example 1.

Example 6: Example of Application to Imaging Device

FIG. 11 is a sectional view of an imaging device according to an example 6. An imaging device 20 includes an imaging lens system 11 and an image sensor 21. The imaging lens system 11 and the image sensor 21 are housed in a casing (not shown). The imaging lens system 11 is the imaging lens system 11 described in the first embodiment.

The image sensor 21 is an element that converts incident light into an electrical signal, and a CD image sensor, a CMOS image sensor or the like is used, for example. The image sensor 21 is placed at an image location in the imaging lens system 11. Note that the horizontal angle of view is the angle of view corresponding to the horizontal direction of the image sensor 21.

It should be noted that the present invention is not limited to the above-described examples and may be varied in many ways within the scope of the present invention. For example, the example 6 may be applied to Examples 2 to 5. Further, although the lens 7 is preferably a lens having a negative power, the lens 7 is a lens for correcting a field, and the field correction can be made with a positive power. Thus, the lens 7 may be a lens having a positive power.

REFERENCE SIGNS LIST

11 IMAGING LENS SYSTEM
12 CUT FILTER
20 IMAGING DEVICE
21 IMAGE SENSOR
L1, L2, L3, L4, L5, L6, L7 LENS

The invention claimed is:

1. An imaging lens comprising exactly seven lenses, the imaging lens including, sequentially from an object side:
    a first lens having a negative power and being concave on an image side;
    a second lens having a negative power and being concave on the image side;
    a third lens having a positive power and being convex on an object side;
    an aperture stop;
    a fourth lens having a positive power and being convex on the image side;
    a fifth lens;
    a sixth lens whose object side is bonded to the image side of the fifth lens; and
    a seventh lens being convex on the image side,
    wherein expressions (1) and (2) are satisfied:

$-3.0 < f5/f < -2.2$ (1).

$2.8 < f4/f < 3.5$ (2).

where a focal length of the fifth lens is f5, a focal length of the fourth lens is f4 and a focal length of an entire lens optical system is f.

2. The imaging lens according to claim 1, wherein the fourth lens is an aspheric lens.

3. The imaging lens according to claim 1, wherein the fourth lens has the highest power out of lenses having a positive power among the first lens to the seventh lens.

4. The imaging lens according to claim 1, wherein the image side of the fifth lens and the object side of the sixth lens each have an aspheric shape.

5. The imaging lens according to claim 1, wherein the second lens, the third lens, the fifth lens, the sixth lens and the seventh lens are plastic lenses.

6. An imaging device comprising:
   an imaging lens system according to claim 1;
   a flat-plate cover glass placed on an object side of the imaging lens system; and
   an image sensor placed at an image location of the imaging lens system.

\* \* \* \* \*